United States Patent
Tsunoda et al.

(10) Patent No.: US 9,457,838 B2
(45) Date of Patent: Oct. 4, 2016

(54) ELECTRIC POWER STEERING SYSTEM

(71) Applicant: NSK LTD., Shinagawa-ku, Tokyo (JP)

(72) Inventors: Mikihiko Tsunoda, Gunma (JP); Mitsunori Okubo, Gunma (JP); Naoki Sawada, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/368,860

(22) PCT Filed: Oct. 24, 2013

(86) PCT No.: PCT/JP2013/006319
§ 371 (c)(1),
(2) Date: Jun. 26, 2014

(87) PCT Pub. No.: WO2014/155441
PCT Pub. Date: Oct. 2, 2014

(65) Prior Publication Data
US 2016/0059886 A1    Mar. 3, 2016

(30) Foreign Application Priority Data

Mar. 27, 2013  (JP) ................................ 2013-066750

(51) Int. Cl.
*A01B 69/00* (2006.01)
*B62D 5/04* (2006.01)

(52) U.S. Cl.
CPC ............ *B62D 5/0484* (2013.01); *B62D 5/049* (2013.01); *B62D 5/0463* (2013.01); *B62D 5/0487* (2013.01)

(58) Field of Classification Search
CPC .. B62D 5/046; B62D 5/0481; B62D 5/0484; B62D 5/049
See application file for complete search history.

(56) References Cited

U.S. PATENT DOCUMENTS

| | | | |
|---|---|---|---|
| 2007/0000717 A1 | 1/2007 | Kumaido et al. | |
| 2007/0199764 A1* | 8/2007 | Kifuku ................ | B62D 5/0463 180/446 |
| 2011/0218704 A1 | 9/2011 | Kanekawa et al. | |

FOREIGN PATENT DOCUMENTS

| | | |
|---|---|---|
| JP | 2004-196127 A | 7/2004 |
| JP | 2004-196128 A | 7/2004 |

(Continued)

OTHER PUBLICATIONS

English translation of document C1 (International Search Report (PCT/ISA/210) dated Feb. 4, 2014) previously filed on Jun. 26, 2014 (two pages).

(Continued)

*Primary Examiner* — Michael D Lang
(74) *Attorney, Agent, or Firm* — Crowell & Moring LLP

(57) ABSTRACT

An electric power steering system is provided which can take an abnormality countermeasure without being affected by a torque abnormality signal and without giving an uncomfortable feeling to a driver when torque abnormality occurs. Abnormality of a steering assist command value is detected by employing a dual detection configuration of a main ECU clip (34) and a sub ECU interlock (62). When abnormality of a steering torque Ti detected by a torque sensor (3) is detected, input values to the main ECU clip (34) and the sub ECU interlock (62) are switched from the steering torque Ti detected by the torque sensor (3) to an alternative torque value. Here, the alternative torque value employs a previous torque value calculated based upon the normal steering torque Ti detected by the torque sensor (3) when the abnormality of the steering torque Ti detected by the torque sensor (3) is not detected.

15 Claims, 5 Drawing Sheets

(56) References Cited

FOREIGN PATENT DOCUMENTS

| | | |
|---|---|---|
| JP | 2005-75026 A | 3/2005 |
| JP | 3923957 B2 | 6/2007 |
| JP | 2007-196829 A | 8/2007 |
| JP | 2008-87692 A | 4/2008 |
| JP | 2011-97810 A | 5/2011 |
| JP | 2011-183923 A | 9/2011 |

OTHER PUBLICATIONS

International Search Report (PCT/ISA/210) dated Feb. 4, 2014 with partial English translation thereof {Four (4) pages}.
Written Opinion (PCT/ISA/237) dated Feb. 4, 2014 with English translation thereof {Six (6) pages}.
European Search Report issued in counterpart European Application No. 13877432.8 dated Jan. 21, 2016 (seven pages).

* cited by examiner

ELECTRIC POWER STEERING SYSTEM

TECHNICAL FIELD

The present invention relates to an electric power steering system including an electric motor that generates a steering assist torque to be applied to a steering mechanism.

BACKGROUND ART

In recent years, an electric power steering system has become widespread. In the electric power steering system, a steering assist force is applied to a steering mechanism by driving an electric motor based upon a steering torque with which a driver steers a steering wheel.

For example, a technique described in PTL 1 is known as such an electric power steering system. In this technique, when abnormality of an output value of a torque sensor is detected, an electric motor is controlled by using an alternative value calculated based upon a previous output value of the torque sensor. Accordingly, a rapid assist variation when abnormality occurs at the torque sensor is alleviated.

However, with recent demands for a redundant system of a steering function, a dual safety structure is desired for an electric power steering system. For example, a technique described in PTL 2 is known as such an electric power steering system. In this technique, a sub microcomputer is provided with an abnormality detecting function and a power steering operation is permitted only when a main microcomputer drives a motor in a drive-permitted region, but the power steering operation is prohibited in a drive-prohibited region. Accordingly, serious abnormality in which a steering direction is different from a generated assist torque value is prevented.

CITATION LIST

Patent Literature

PTL 1: JP 2005-75026 A
PTL 2: JP Patent No. 3923957

SUMMARY OF INVENTION

Technical Problem

However, in the technique described in PTL 2, a torque signal from a torque sensor is directly input to the sub microcomputer. Accordingly, when powering or grounding failure occurs at the torque sensor signal, the abnormality detecting function is performed by using the abnormal torque value. As a result, in this configuration, the power steering operation is prohibited immediately when abnormality occurs, and thus a driver's steering load rapidly increases, thereby giving an uncomfortable feeling to the driver.

Therefore, an object of the present invention is to provide an electric power steering system which can take an abnormality countermeasure without being affected by a torque abnormality signal and without giving an uncomfortable feeling to a driver when torque abnormality occurs.

Solution to Problem

In order to achieve the above-mentioned object, according to a first aspect of the present invention, there is provided an electric power steering system including: an electric motor that applies a steering assist force for reducing a driver's steering load to a steering system; a torque detecting unit that detects a steering torque; and a steering assist command value computing unit that computes a steering assist command value based upon at least the steering torque detected by the torque detecting unit. The first aspect further includes: a clip unit that limits the steering assist command value by use of a predetermined limit value based upon the steering torque detected by the torque detecting unit does not exceed an allowable range so that the steering assist command value computed by the steering assist command value computing unit; a motor control unit that controls driving of the electric motor based upon the steering assist command value limited by the clip unit; and an interlock unit that has a monitoring function of permitting or prohibiting the driving of the electric motor controlled by the motor control unit based upon the steering torque detected by the torque detecting unit. The above electric power steering system may further include: a torque abnormality detecting unit that detects abnormality of the steering torque detected by the torque detecting unit; and an alternative torque value computing unit that, when the abnormality is detected by the torque abnormality detecting unit, computes an alternative steering torque value based upon the steering torque that is normal, which is detected by the torque detecting unit, when the abnormality is not detected. The above electric power steering system may further include an input switching unit that switches an input value to the clip unit and an input value to the interlock unit from the steering torque detected by the torque detecting unit to the alternative steering torque value computed by the alternative torque value computing unit, when the abnormality is detected by the torque abnormality detecting unit.

In this way, since the steering assist command value is controlled and monitored by the clip unit and the interlock unit, it is possible to implement a dual safety structure and thus to improve the system reliability. When torque system abnormality occurs, the input values to the clip unit and the interlock unit are switched to a previous torque value. Accordingly, it is possible to avoid controlling and monitoring with an abnormal torque value and thus to take an abnormality countermeasure appropriately.

According to a second aspect of the present invention, it is preferable that the alternative torque value computing unit compute, as the alternative steering torque value, a minimum value out of the steering torques that are normal detected by the torque detecting unit within a predetermined period of time immediately before the abnormality is detected by the torque abnormality detecting unit. Accordingly, even when abnormality occurs, it is possible to more safely set the system and to take an abnormality countermeasure.

According to a third aspect of the present invention, it is preferable to include: a second alternative torque value computing unit that computes, when the abnormality is detected by the torque abnormality detecting unit, a second alternative steering torque value based upon the steering torque that is normal detected by the torque detecting unit when the abnormality is not detected; and a second input switching unit that switches an input value to the steering assist command value computing unit from the steering torque detected by the torque detecting unit to the second alternative steering torque value computed by the second alternative torque value computing unit, when the abnormality is detected by the torque abnormality detecting unit.

In this way, the steering assist command value is computed by using the previous torque value in the normal state instead of the abnormal torque value when abnormality occurs. Accordingly, it is possible to secure a determination time of torque sensor abnormality long enough to prevent a rapid variation in steering force and to secure a correct torque output even when the torque sensor is abnormal.

In addition, according to a fourth aspect of the present invention, it is preferable that the clip unit include a gradual change unit that gradually changes the limit value toward zero when the abnormality is detected by the torque abnormality detecting unit.

Hence, it is possible to slowly limit the assist operation without stopping the assist operation immediately when abnormality occurs. Accordingly, it is possible to prevent an uncomfortable feeling from being given to a driver and to safely stop the system.

Furthermore, according to a fifth aspect of the present invention, it is preferable that the interlock unit stop the monitoring function, when the abnormality is detected by the torque abnormality detecting unit.

Therefore, it is possible to satisfactorily prevent an abnormality countermeasure from not being performed due to an interlock function when abnormality occurs. As a result, it is possible to satisfactorily take an abnormality countermeasure without suddenly stopping the assist and without giving an uncomfortable feeling to a driver.

According to a sixth aspect of the present invention, it is preferable to further include an abnormality detection result determining unit that determines validity of the abnormality detection result of the torque abnormality detecting unit based upon a comparison result of the steering torque detected by the torque detecting unit with the steering torque to be input to the clip unit out of the steering torque detected by the torque detecting unit, and the alternative steering torque value computed by the alternative torque value computing unit. Accordingly, it is possible to further improve system reliability.

Advantageous Effects of Invention

According to the present invention, when the torque abnormality occurs, it is possible to take an abnormality countermeasure without being affected by an abnormal torque value. Accordingly, it is possible to safely stop the system without suddenly stopping the assist and without giving an uncomfortable feeling to a driver when the torque abnormality occurs.

DESCRIPTION OF EMBODIMENTS

Hereinafter, embodiments of the present invention will be described with reference to the accompanying drawings.

Figure 1:
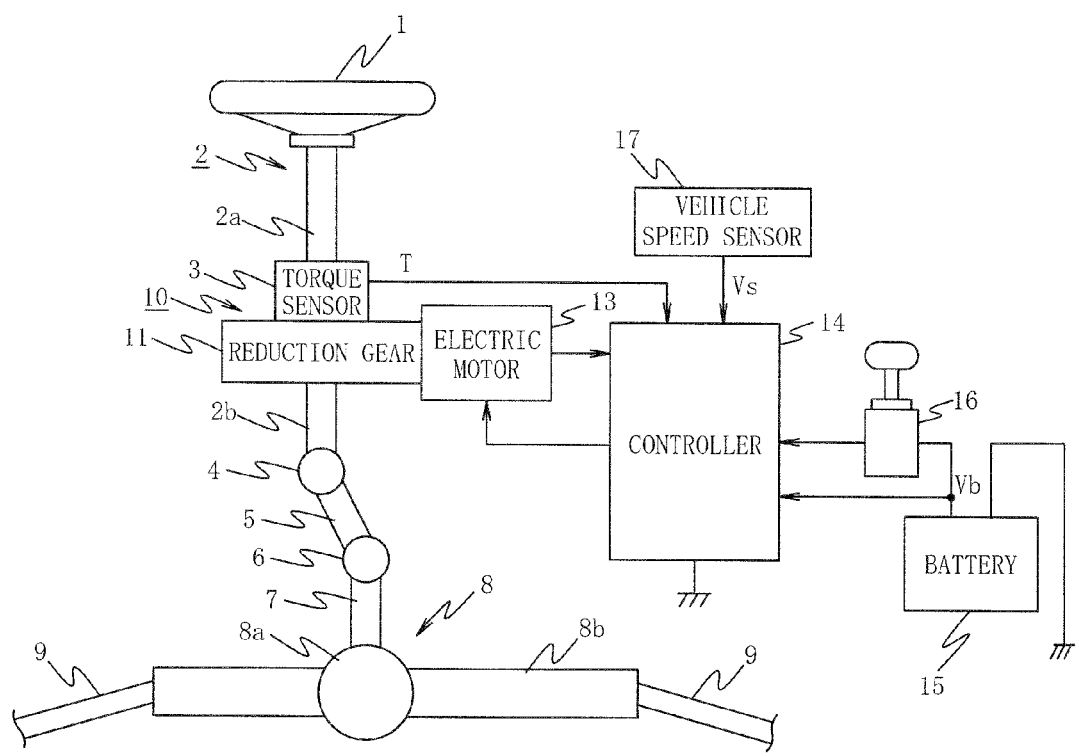
FIG. 1 is a diagram illustrating the entire configuration of an electric power steering system according to the present invention.

FIG. 1 is a diagram illustrating the entire configuration of an electric power steering system according to the present invention.

In the drawing, reference numeral 1 represents a steering wheel of a vehicle, and a steering force exerted by a driver is applied to the steering wheel 1 and is transmitted to a steering shaft 2 including an input shaft 2a and an output shaft 2b. In the steering shaft 2, one end of the input shaft 2a is connected to the steering wheel 1 and the other end is connected to one end of the output shaft 2b via a torque sensor 3.

The steering force transmitted to the output shaft 2b is transmitted to an intermediate shaft 5 via a universal joint 4 and is then transmitted a pinion shaft 7 via a universal joint 6. The steering force transmitted to the pinion shaft 7 is transmitted to tie rods 9 via a steering gear 8 to turn turning wheels, not illustrated. Here, the steering gear 8 is formed in a rack-and-pinion form including a pinion 8a connected to the pinion shaft 7 and a rack 8b engaging with the pinion 8a, and converts a rotational motion transmitted to the pinion 8a into a translational motion by the use of the rack 8b.

A steering assist mechanism 10 that transmits a steering assist force to the output shaft 2b is coupled to the output shaft 2b of the steering shaft 2. The steering assist mechanism 10 includes a reduction gear 11 coupled to the output shaft 2b and an electric motor 13 coupled to the reduction gear 11 to generate the steering assist force to the steering system.

The steering torque sensor 3 detects the steering torque applied to the steering wheel 1 and transmitted to the input shaft 2a and is configured to convert the steering torque into a torsion angle variation of a torsion bar, not illustrated, interposed between the input shaft 2a and the output shaft 2b, to detect the torsion angle variation as a magnetic signal, and to convert the magnetic signal into a current signal, for example.

The steering torque sensor 3 detects the steering torque applied to the steering wheel 1 and transmitted to the input shaft 2a and is configured to detect a relative displacement (i.e., rotational displacement) between the input shaft 2a and the output shaft 2b connected to each other by a torsion bar, not illustrated, so as to correspond to a variation in impedance of a coil pair. The torque detection value T output from the steering torque sensor 3 is input to a controller (i.e., ECU) 14.

The controller 14 operates by being supplied with power from a battery 15 which is an on-board power supply. The negative electrode of the battery 15 is grounded, and the positive electrode thereof is connected to the controller 14 via an ignition switch 16 starting an engine and is also connected directly to the controller 14 without passing through the ignition switch 16.

In addition to the torque detection value T, a vehicle speed detection value Vs detected by a vehicle speed sensor 17 is input to the controller 14. Then, steering assist control for applying a steering assist force to a steering system is performed based upon the input values. Specifically, a steering assist command value (i.e., a steering assist torque command value) for causing the electric motor 13 to generate the steering assist force is calculated through a known procedure, and a current command value of the electric motor 13 is calculated based upon the calculated steering assist command value. A drive current to be supplied to the electric motor 13 is controlled in a feedback manner using the calculated current command value and a motor current detection value.

A specific configuration of the controller 14 will be described below.

Figure 2:
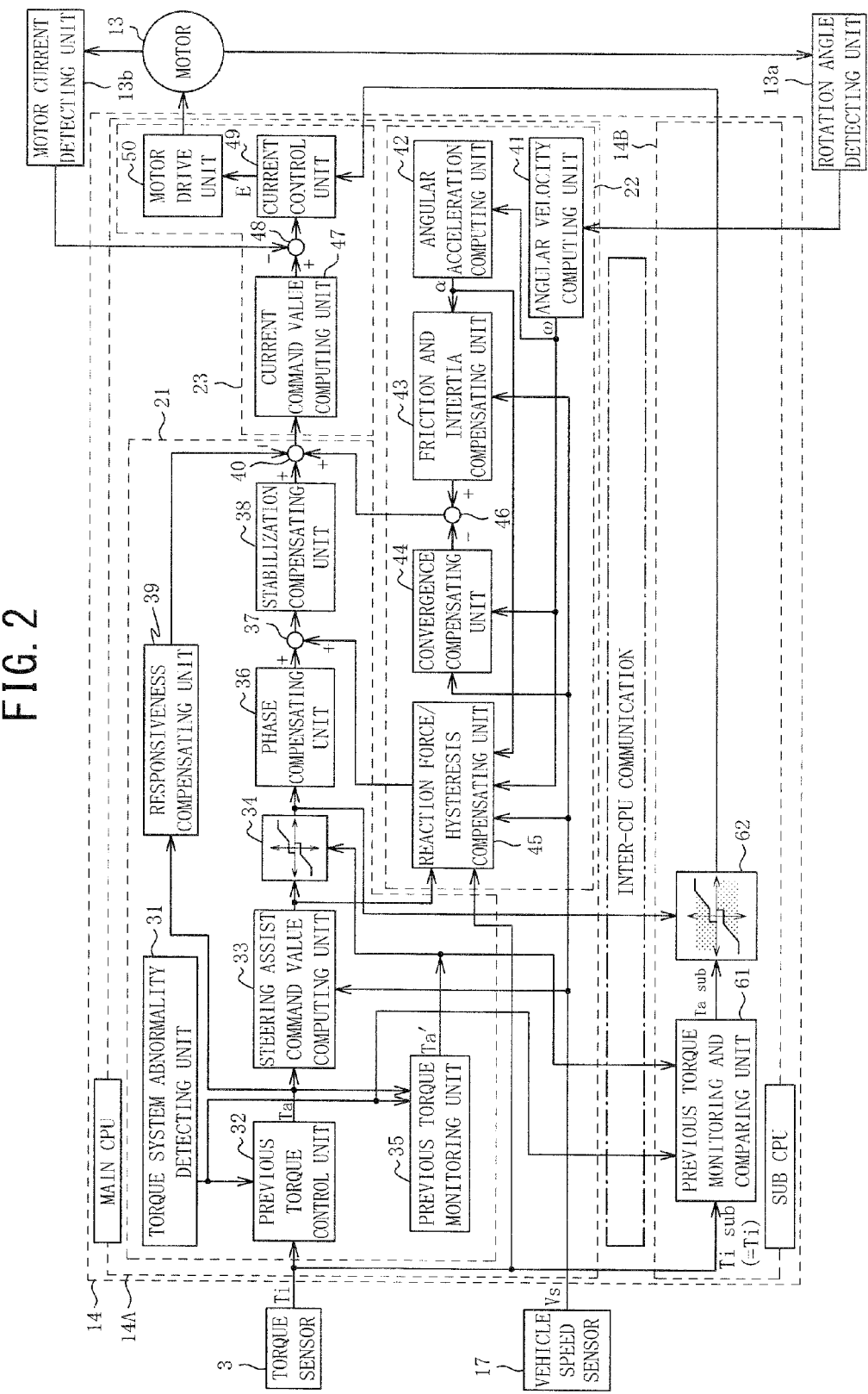
FIG. 2 is a block diagram illustrating a specific configuration of a controller.

The controller 14 includes a main CPU 14A and a sub CPU 14B as illustrated in FIG. 2. The main CPU 14A includes a command value computing unit 21 that computes the steering assist command value (i.e., a steering assist torque command value), a command value compensating unit 22 that compensates for the steering assist command value, and a motor control unit 23 that controls driving of the electric motor 13 based upon the steering assist command value compensated for by the command value compensating unit 22.

The command value computing unit 21 includes a torque system abnormality detecting unit 31, a previous torque control unit 32, a steering assist command value computing unit 33, a main ECU clip (i.e., q-axis current clip) 34, a previous torque monitoring unit 35, a phase compensating unit 36, an adder unit 37, a stabilization compensating unit 38, a responsiveness compensating unit 39, and an adder unit 40.

Figure 3:
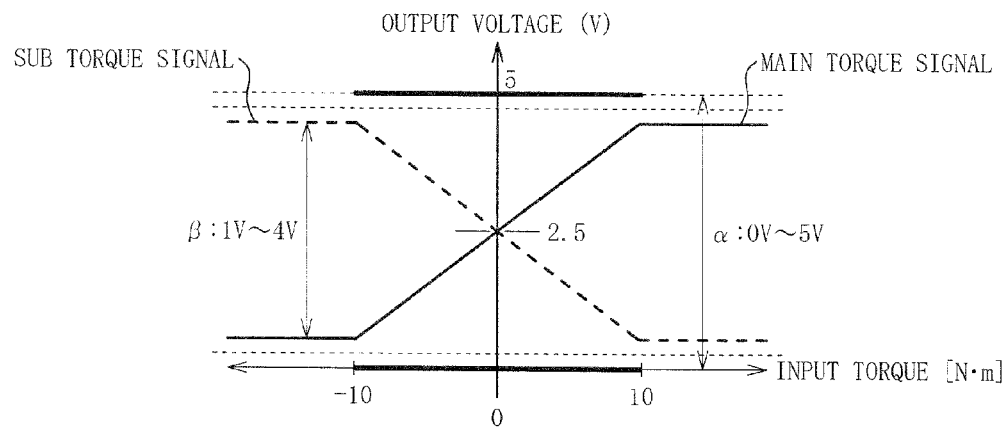
FIG. 3 is a diagram illustrating torque characteristics.

The torque system abnormality detecting unit 31 detects abnormality of an output value of the torque sensor 3 and outputs the detection result as a torque system abnormality occurrence flag. Here, the output value of the torque sensor 3 has characteristics in which a main torque signal and a sub torque signal cross each other in a normal state as illustrated in FIG. 3. The rated range of the torque sensor 3 is a range of 0 V to 5 V which is indicated by reference sign $\alpha$, and a normally-used range is a range of 1 V to 4 V which is set within the rated range by a mechanical stopper (such as a torsion range of a torsion bar) is indicated by reference sign $\beta$.

When the torque sensor 3 causes powering or grounding failure, the main torque signal and the sub torque signal stick to the upper and lower limits (i.e., 0 V, 5 V) of the rated range of the torque sensor 3. Therefore, when the main torque signal and the sub torque signal are equal to or less than a predetermined value (for example, 0.3 V) in the vicinity of 0 V or are equal to or greater than a predetermined value (for example, 4.7 V) in the vicinity of 5 V, it is determined that the main torque signal and the sub torque signal depart from normal cross characteristics and a torque system abnormal occurrence flag is set to an ON state which indicates that abnormality occurs. When the main torque signal and the sub torque signal satisfy the normal cross characteristics, the torque system abnormality occurrence flag is set to an OFF state which indicates that abnormality does not occur.

Figure 4:
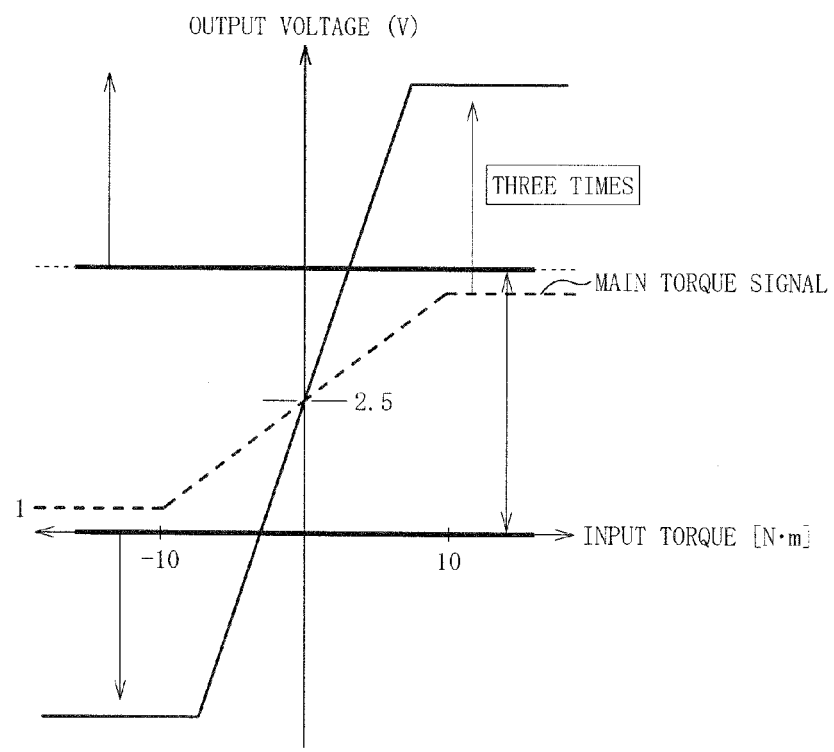
FIG. 4 is a diagram illustrating torque characteristics (three times)

Recently, high-degree control of a relationship with a road surface reaction force, convergence, and steering responsiveness, and the like is demanded for actual steering, and addition of a gain (i.e., three times in this case) is considered to improve a resolution of a torque signal, as illustrated in FIG. 4. However, when the torque gain is set three times, an abnormal determination value has to be set three times and the computational load increases, which is not efficient.

Referring back to FIG. 2, the previous torque control unit 32 receives the steering torque Ti (i.e., a steering torque T at time i) detected by the torque sensor 3 and outputs a steering torque Ta based upon the torque system abnormality occurrence flag output from the torque system abnormality detecting unit 31. Here, the previous torque control unit 32 outputs the steering torque Ti as the steering torque Ta when the torque system abnormality occurrence flag is in an OFF state, and outputs a normal steering torque (i.e., previous torque value), which is detected by the torque sensor 3 before the torque system abnormality occurs, as the steering torque Ta when the torque system abnormality occurrence flag is in an ON state.

Figure 5:
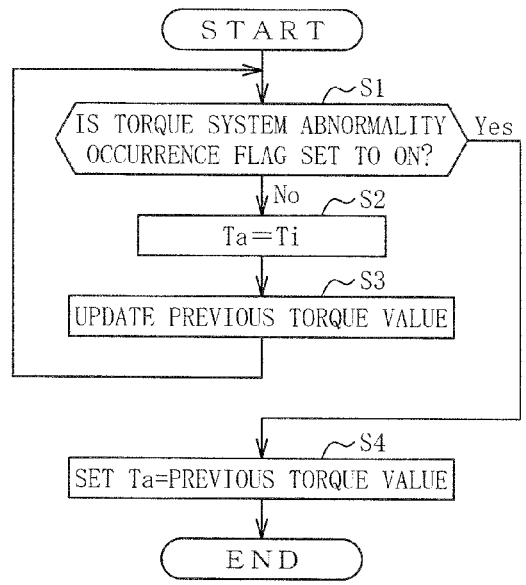
FIG. 5 is a flowchart illustrating a previous torque control procedure.

FIG. 5 is a flowchart illustrating a previous torque control procedure performed by the previous torque control unit 32.

Firstly, in step S1, the previous torque control unit 32 determines whether or not the torque system abnormality occurrence flag is in an ON state. When it is determined that the torque system abnormality occurrence flag is in an OFF state, it is determined that abnormality does not occur in the torque system and the procedure goes to step S2. When it is determined that the torque system abnormality occurrence flag is in an ON state, it is determined that abnormality occurs in the torque system and the procedure goes to step S4 to be described later.

In step S2, the previous torque control unit 32 acquires the steering torque Ti from the torque sensor 3, sets the acquired steering torque as the steering torque Ta, and outputs the steering torque. Then, the procedure goes to step S3.

In step S3, the previous torque control unit 32 updates the previous torque value and then the procedure goes to step S1. Here, the previous torque value is an average value of steering torque detection values (i.e., previous torque detection values) of n latest samples (for example, six samples). In the following description, the previous torque detection value of six samples before is defined as $T(i-6)$, the previous torque detection value of five samples before is defined as $T(i-5)$, . . . , and the previous torque detection value of one sample before is defined as $T(i-1)$.

In step S3, firstly, the previous torque control unit 32 updates the previous torque detection values $T(i-6)$, $T(i-5)$, . . . , and $T(i-1)$ stored in a memory. That is, $T(i-6)=T(i-5)$, $T(i-5)=T(i-4)$, . . . , and $T(i-1)=Ti$ are set to update the previous torque detection values in the memory. Subsequently, the average value of the previous torque detection values is calculated and the calculated average value $((T(i-6)+T(i-5)+ \ldots +T(i-1))/6)$ is stored as the previous torque value in the memory.

Here, the average values of n latest samples is set as the previous torque value, but for example, a weighted average value of n latest samples, a value calculated from n latest samples by using a least squares method, or a value obtained by preparing an (n−1)-th order expression with the latest n samples and predicting a current value may be set as the previous torque value.

In step S4, the previous torque control unit 32 sets the previous torque value stored in the memory as the steering torque Ta, outputs the steering torque, and then ends the previous torque control procedure.

The steering assist command value computing unit 33 computes a steering assist command value with reference to a steering assist command value calculation map based upon the steering torque Ta and the vehicle speed Vs. Here, the steering assist command value calculation map is configured as a characteristic diagram in which the horizontal axis represents the steering torque Ta, the vertical axis represents the steering assist command value, and the vehicle speed Vs is used as a parameter. The steering assist command value initially increases slowly with an increase of the steering torque Ta and the steering assist command value increases rapidly with a further increase of the steering torque Ta. The slopes of the characteristic curves are set to decrease with an increase of the vehicle speed Vs. Each characteristic curve is provided with a limit value.

The main ECU clip 34 performs a process of limiting the steering assist command value by use of a predetermined limit value (i.e., upper and lower limit values) so that the steering assist command value computed by the steering assist command value computing unit 33 does not exceed an allowable range. Here, the limit value of the steering assist command value is determined depending on the steering torque Ta' output from the previous torque monitoring unit 35 to be described later. The main ECU clip 34 is used to detect abnormality of the steering assist command value and abnormality of a steering direction due to failure (i.e., a powering or grounding failure) of the torque sensor 3.

The previous torque monitoring unit 35 receives the torque system abnormality occurrence flag output from the torque system abnormality detecting unit 31 and the steering torque Ta output from the previous torque control unit 32. The previous torque monitoring unit 35 outputs the steering torque Ta input from the previous torque control unit 32 as the steering torque Ta' in a normal state and outputs the previous torque value as the steering torque Ta' when abnormality occurs in the torque system.

Figure 6:
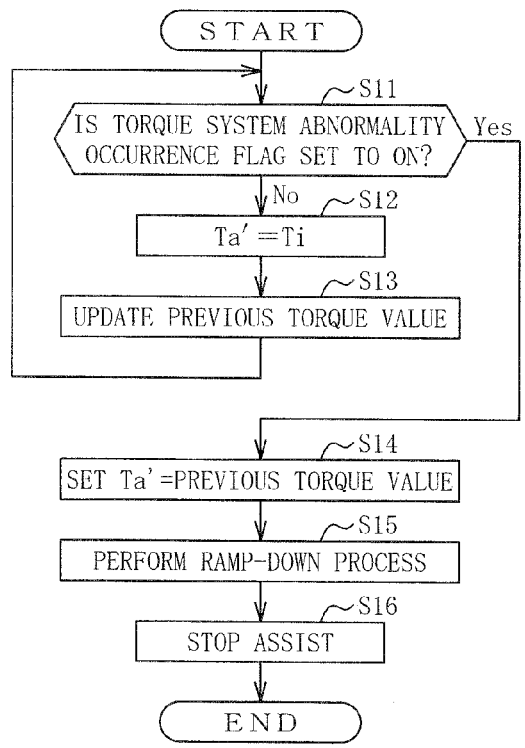
FIG. 6 is a flowchart illustrating a previous torque monitoring procedure.

FIG. 6 is a flowchart illustrating a previous torque monitoring procedure performed by the previous torque monitoring unit 35.

Firstly, in step S11, the previous torque monitoring unit 35 determines whether the torque system abnormality occurrence flag is in an ON state. When the torque system abnormality occurrence flag is in an OFF state, it is determined that abnormality does not occur in the torque system and then the procedure goes to step S12. When the torque system abnormality occurrence flag is an ON state, it is determined that abnormality occurs in the torque system and the procedure goes to step S14 to be described later.

In step S12, the previous torque monitoring unit 35 sets the steering torque Ta output from the previous torque control unit 32 as the steering torque Ta', and the procedure goes to step S13. Here, when the torque system abnormality occurrence flag is in an OFF state, the steering torque Ta is equal to the steering torque Ti detected by the torque sensor 3. Accordingly, the steering torque Ta' set in step S12 is equal to the steering torque Ti.

In step S13, the previous torque monitoring unit 35 firstly updates the previous torque detection values (T(i−6), T(i−5), . . . , and T(i−1)). That is, T(i−6)=T(i−5), T(i−5)=T(i−4), . . . , and T(i−1)=Ta are set. Subsequently, a minimum value out of the previous torque detection values is selected and the selected minimum value (min(T(i−6), T(i−5), . . . , T(i−1))) is stored as the previous torque value in the memory.

In step S14, the previous torque monitoring unit 35 sets the previous torque value stored in the memory as the steering torque Ta' and the procedure goes to step S15.

Figure 7:
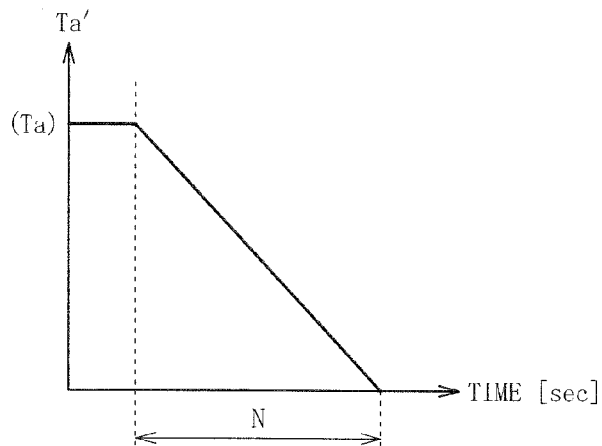
FIG. 7 is a diagram illustrating a ramp-down procedure.

In step S15, the previous torque monitoring unit 35 performs a ramp-down process illustrated in FIG. 7 on the steering torque Ta'. That is, the steering torque Ta' gradually decreases to 0 for a predetermined period of time N seconds from the steering torque Ta' at the torque system abnormality occurrence time point determined by the steering torque Ta.

When the steering torque Ta' is 0, the previous torque monitoring unit 35 stops the steering assist operation based upon the steering assist control (stops the electric motor 13) in step S16 and ends the torque monitoring process.

Referring back to FIG. 2, the phase compensating unit 36 performs a phase compensating process on the steering assist command value clipped by the main ECU clip 34 and outputs the phase-compensated steering assist command value to the adder unit 37. Here, for example, it is assumed that a transmission characteristic such as $(T_1s+1)/(T_2s+1)$ is applied to the steering assist command value.

The adder unit 37 adds the phase-compensated steering assist command value output from the phase compensating unit 36 and a Self Aligning Torque (SAT) output from the reaction force/hysteresis compensating unit 45 to be described later and outputs the addition result to the stabilization compensating unit 38.

The stabilization compensating unit 38 removes a peak value of a resonance frequency of a resonance system including an inertia element and a spring element included in the detected torque to compensate for a phase misalignment of the resonance frequency which hinders stability and responsiveness of the control system. For example, a characteristic expression $G(s)=(s^2+a1 \cdot s+a2)/(s^2+b1 \cdot s+b2)$ having s as a Laplace operator is established. Here, a1, a2, b1, and b2 in the characteristic expression $G(s)$ are parameters determined by the resonance frequency of the resonance system.

The responsiveness compensating unit 39 receives the steering torque Ta and outputs a responsiveness compensation command value to the adder unit 40. The responsiveness compensating unit 39 is configured to secure stability in an assist characteristic dead zone and to compensate for a static friction.

The adder unit 40 adds the stabilization-compensated steering assist command value output from the stabilization compensating unit 38, the responsiveness compensation command value output from the responsiveness compensating unit 39, and the command compensation value output from the subtractor unit 46 to be described later, and outputs the result as the steering assist command value, which is the output result of the command value computing unit 21, to the current command value computing unit 47 to be described later.

The command value compensating unit 22 includes an angular velocity computing unit 41, an angular acceleration computing unit 42, a friction and inertia compensating unit 43, a convergence compensating unit 44, a reaction force/hysteresis compensating unit 45, and a subtractor unit 46.

The angular velocity computing unit 41 differentiates a motor rotation angle detected by the rotation angle detecting unit 13a to compute a motor angular velocity ω.

The angular acceleration computing unit 42 differentiates the motor angular velocity ω computed by the angular velocity computing unit 41 to compute a motor angular acceleration α.

The friction and inertia compensating unit 43 compensates for a torque-conforming value generated by the inertia of the electric motor 13 based upon the motor angular acceleration α computed by the angular acceleration computing unit 42 and outputs an inertia compensation value for preventing deterioration of the inertial sensitiveness or control responsiveness.

The convergence compensating unit 44 outputs a convergence compensation value for compensating for convergence of a yaw rate based upon the motor angular velocity ω computed by the angular velocity computing unit 41. That is, in order to improve the convergence of a yaw of a vehicle, the convergence compensating unit 44 calculates the convergence compensation value so as to put on the brake on the rotating operation of the steering wheel 1.

The reaction force/hysteresis compensating unit 45 receives the steering torque Ti, the vehicle speed Vs, the motor angular velocity ω, the motor angular acceleration α, and the steering assist command value computed by the steering assist command value computing unit 33, estimates and calculates the Self Aligning Torque (SAT) based upon the input data, and outputs the result to the adder unit 37.

The subtractor unit 46 subtracts the convergence compensation value calculated by the convergence compensating unit 44 from the inertia compensation value calculated by the friction and inertia compensating unit 43 and outputs the result as the command compensation value, which is the output result of the command value compensating unit 22, to the adder unit 40.

In addition, the motor control unit 23 includes a current command value computing unit 47, a subtractor unit 48, a current control unit 49, and a motor drive unit 50.

The current command value computing unit 47 computes a current command value of the electric motor 13 from the steering assist command value (i.e., a steering assist torque command value) output from the command value computing unit 21.

The subtractor unit 48 calculates a current deviation between the current command value computed by the current command value computing unit 47 and the motor current detection value detected by the motor current detecting unit 13b, and outputs the calculation result to the current control unit 49.

The current control unit 49 performs feedback control of performing a proportional integral operation on the current deviation and outputting a voltage command value E. Here, the current control unit 49 receives an assist prohibiting signal output from a sub ECU interlock 62 to be described later, and performs an assist prohibiting process of setting the current command value E to 0 based upon the assist prohibiting signal.

The motor drive unit 50 performs a duty calculating operation based upon the voltage command value E output from the current control unit 49 to calculate a duty ratio to be a drive command for the electric motor 13. The motor drive unit drives the electric motor 13 based upon the duty ratio.

Further, the sub CPU 14B includes a previous torque monitoring and comparing unit 61 and a sub ECU interlock (q-axis current interlock) 62. The sub CPU 14B can transmit and receive data on inter-CPU communication with the main CPU 14A.

Figure 8:
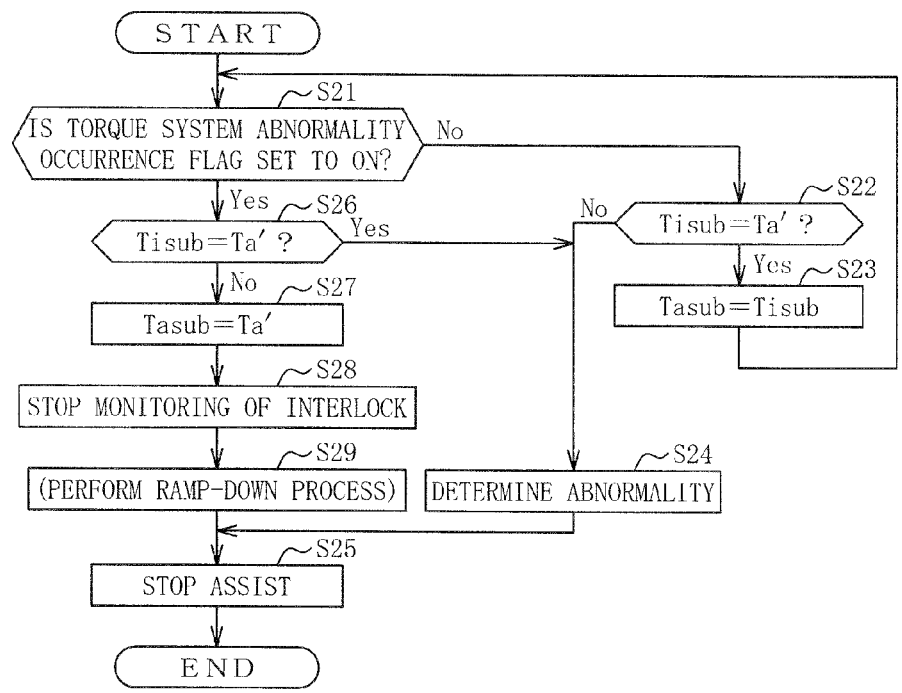
FIG. 8 is a flowchart illustrating a previous torque monitoring and comparing procedure.

The previous torque monitoring and comparing unit 61 receives the steering torque Ti detected by the torque sensor 3 as a steering torque Tisub, and also receives the torque system abnormality occurrence flag output from the torque system abnormality detecting unit 31 and the steering torque Ta' output from the previous torque monitoring unit 35. These various signals are input on the inter-CPU communication between the main CPU 14A and the sub CPU 14B. The previous torque monitoring and comparing unit 61 performs a previous torque monitoring and comparing procedure, as illustrated in FIG. 8, based upon the input signals.

Firstly, in step S21, the previous torque monitoring and comparing unit 61 determines whether or not the torque system abnormality occurrence flag is in an ON state. When the torque system abnormality occurrence flag is in an OFF state, it is determined that abnormality does not occur in the torque system and the procedure goes to step S22. When the torque system abnormality occurrence flag is in an ON state, it is determined that abnormality occurs in the torque system and the procedure goes to step S26.

In step S22, the previous torque monitoring and comparing unit 61 determines whether or not the steering torque Tisub is equal to the steering torque Ta'. When the previous torque control unit 32 and the previous torque monitoring unit 35 normally operate in a normal state where abnormality does not occur in the torque system, the steering torque Ta' is equal to the steering torque Ti. Accordingly, when the torque system abnormality occurrence flag is in an OFF state and the steering torque Tisub is equal to the steering torque Ta', it can be determined that the abnormality detection result of the torque system abnormality detecting unit 31 is valid.

Therefore, when the determination result is Tisub=Ta', the procedure goes to step S23, the input steering torque Tisub is set as the steering torque Tasub, and the resultant steering torque is output to the sub ECU interlock 62 to be described later. Thereafter, the procedure goes to step S21.

On the other hand, when the determination result of step S22 is Tisub≠Ta', it is determined in step S24 that the abnormality detection result of the torque system abnormality detecting unit 31 is not valid and the procedure goes to step S25. In step S25, the previous torque monitoring and comparing unit 61 stops the steering assist by using the steering assist control and ends the previous torque monitoring and comparing procedure.

In step S26, the previous torque monitoring and comparing unit 61 determines whether or not the steering torque Tisub is equal to the steering torque Ta'. When abnormality occurs in the torque system and the previous torque control unit 32 and the previous torque monitoring unit 35 normally operate, the steering torque Ta' is different from the steering torque Ti. Accordingly, when the steering torque Tisub is equal to the steering torque Ta', the procedure goes to step S24.

On the other hand, when the determination result of step S26 is Tisub≠Ta', it is determined that the abnormality detection result of the torque system abnormality detecting unit 31 is valid and the procedure goes to step S27. In step S27, the previous torque monitoring and comparing unit 61 sets the steering torque Ta' input from the main CPU 14A as the steering torque Tasub and outputs the resultant steering torque to the sub ECU interlock 62. Thereafter, the procedure goes to step S28.

In step S28, the previous torque monitoring and comparing unit 61 stops the operation of the sub ECU interlock 62 when the main ECU clip 34 starts the ramp-down process. Thereafter, the procedure goes to step S29.

In step S29, the previous torque monitoring and comparing unit 61 waits until the ramp-down process of the main ECU clip 35 is finished. Thereafter, the procedure goes to step S25.

In this way, the previous torque monitoring and comparing unit 61 outputs the steering torque Ti detected by the torque sensor 3 as the input value Tasub to the sub ECU interlock 62, when abnormality does not occur in the torque system, and switches the input value Tasub to the sub ECU interlock 62 to the previous torque value, when abnormality occurs in the torque system. At this time, the previous torque monitoring and comparing unit 61 determines the validity of the abnormality detection result of the torque system abnormality detecting unit 31, and takes a countermeasure of stopping the assist when it is determined that the abnormality detection result is not valid.

Referring back to FIG. 2, the sub ECU interlock 62 receives the steering torque Tasub output from the previous torque monitoring and comparing unit 61 and the limited steering assist command value output from the main ECU clip 34. The sub ECU interlock 62 performs an interlock monitoring operation of permitting or prohibiting the drive control of the electric motor 13 based upon the input data.

That is, the sub ECU interlock 62 determines whether or not the steering torque Tasub and the steering assist command value fall within a predetermined drive-prohibited region of the electric motor 13. When it is determined that the input data fall within the drive-prohibited region, the timer is activated, the assist prohibiting signal is output to the current control unit 49 after a predetermined time passes, and the drive of the electric motor 13 is forcibly stopped.

In this way, the abnormality of the current command value generated from the steering torque Ti and the abnormality of the steering direction due to failure (i.e., powering or grounding failure) of the torque sensor are dually monitored by using the q-axis current clip of the main CPU 14A and the q-axis current interlock of the sub CPU 14B.

When abnormality occurs in the torque sensor, the current command value is generated by using the previous torque value as an alternative value of the steering torque detection value. At this time, the torque value to be input to the q-axis current interlock of the sub CPU 14B is switched to the previous torque value. The q-axis current interlock is stopped while the main CPU 14A is performing the ramp-down process.

The torque sensor 3 corresponds to the torque detecting unit. In FIG. 2, the motor control unit 23 corresponds to the motor control unit, the steering assist command value computing unit 33 corresponds to the steering assist command value computing unit, the main ECU clip 34 corresponds to the clip unit, and the sub ECU interlock 62 corresponds to the interlock unit. In FIG. 5, step S3 corresponds to the second alternative torque value computing unit and step S4 corresponds to the second input switching unit.

In FIG. 6, step S13 corresponds to the alternative torque value computing unit and step S15 corresponds to the gradual change unit. Step S14 of FIG. 6 and step S27 of FIG. 8 correspond to the input switching unit. In FIG. 8, steps S21, S22, and S26 correspond to the abnormality detection result determining unit.

The operations and effects of this embodiment will be described below.

When a driver turns on the ignition switch 16, control power is supplied from the battery 15 to the controller 14 and the controller 14 is activated. At this time, the controller 14 performs the steering assist control based upon the driver's steering operation.

For example, when the driver starts a vehicle and travels along a curved road, the controller 14 calculates the steering assist command value based upon the steering torque Ta (=Ti) and the vehicle speed Vs and calculates the current command value of the electric motor 13 based upon the steering assist command value. Then, the controller calculates the voltage command value E based upon the calculated current command value and the motor current detection value. When the drive of the electric motor 13 is controlled based upon the calculated voltage command value E, the torque generated from the electric motor 13 is converted into a rotational torque of the steering shaft 2 by the reduction gear 11 to assist the driver's steering force. In this way, the driver's steering load is reduced.

At this time, the main ECU clip 34 of the main CPU 14A monitors whether or not the steering assist command value converted from the steering torque Ta is suitable for the steering direction and the detected torque value. Here, the steering assist command value is limited so as not to exceed an allowable range. The limited steering assist command value is input to the sub ECU interlock 62 of the sub CPU 14B, and it is monitored therein whether or not the limited steering assist command value is suitable for the steering direction and the detected torque value. In this way, since abnormality is detected with a dual detection structure of the main CPU 14A and the sub CPU 14B, it is possible to improve the system reliability.

In this way, by disposing the main ECU clip 34 at a stage subsequent to the steering assist command value computing unit 33, the correlation between the current command value and the steering torque is monitored and the opposite phase of the torque is mainly detected. When the phase compensation, responsiveness compensation, or convergence compensation is performed, the opposite phase to the torque detection value may be output. Accordingly, the main ECU clip 34 mainly monitors the system abnormality at the stage immediately subsequent to the steering assist command value computing unit 33 so as not to hinder the compensations.

When the abnormality occurs in the torque system due to failure of the torque sensor 3 in this state, the main CPU 14A performs the steering assist control by using the previous torque value instead of the steering torque Ti detected by the torque sensor 3. That is, the input value Ta to the steering assist command value computing unit 33 is switched from the steering torque Ti to the previous torque value (i.e., an average value of n samples), and the input value Ta' to the main ECU clip 34 is switched from the steering torque Ti to the previous torque value (i.e., the minimum value of n samples).

In addition, at this time, the main CPU 14A performs the ramp-down control of gradually decreasing the steering torque Ta' which is an input value to the main ECU clip 34. By gradually decreasing the steering torque Ta', the limit value (i.e., upper and lower limit values) of the steering assist command value used in the main ECU clip 34 can be gradually varied to 0 and thus the assist can be gradually limited as a result. The assist is completely stopped when a predetermined time (i.e., N seconds) passes after the ramp-down control starts.

In this way, when the abnormality occurs at the output value of the torque sensor 3, the steering assist control by use of the previous torque value is performed instead. Accordingly, it is possible to prevent the steering assist control with the abnormal torque value and thus to alleviate a rapid assist variation. When the abnormality occurs, the ramp-down control is performed and it is thus possible to smoothly limit the assist operation without immediately turning OFF the assist control. Since the steering torque Ta' input to the main ECU clip 34 is gradually decreased in the ramp-down control, it is possible to perform the gradually decreasing process of the assist control with a relatively simple configuration.

Further, when such abnormality occurs, the sub CPU 14B switches the input value Tasub to the sub ECU interlock 62 from the steering torque Ti (Tisub) detected by the torque sensor 3 to the previous torque value. At this time, the previous torque value input to the sub ECU interlock 62 is equal to the previous torque value input to the main ECU clip 34 when the abnormality occurs. Accordingly, it is possible to prevent monitoring of the interlock by use of the abnormal torque value and thus to prevent the assist from being stopped immediately when the abnormality occurs.

Moreover, the sub CPU 14B compares the steering torque Ta' input to the main ECU clip 34 of the main CPU 14A with the steering torque Ti detected by the torque sensor 3, and determines whether or not the torque system abnormality occurrence flag is in a correct state (i.e., the validity of the abnormality detection result of the torque system abnormality detecting unit 31) based upon the comparison result. When it is determined that the torque system abnormality occurrence flag is not in a correct state, the assist control is stopped. Therefore, it is possible to prevent an erroneous operation of the steering assist control.

Additionally, the monitoring function of the sub ECU interlock 62 is stopped when the abnormality occurs. Accordingly, without an influence from the abnormal torque value, it is possible to satisfactorily perform the abnormal countermeasure (i.e., ramp-down control) on the main CPU 14A.

As described above, in this embodiment, when abnormality occurs in the torque system, the abnormality countermeasure can be performed without the use of the abnormal torque value. When abnormality occurs, the assist control can be smoothly limited without immediately turning OFF the assist control and it is thus possible to suppress an uncomfortable feeling of a driver and to safely stop the system.

INDUSTRIAL APPLICABILITY

In the electric power steering system according to the present invention, when torque abnormality occurs, it is possible to take an abnormality countermeasure without an influence of an abnormal torque value. Accordingly, it is possible to safely stop the system without suddenly stopping the assist control and without giving an uncomfortable feeling to a driver when the torque abnormality occurs.

REFERENCE SIGNS LIST

- 1: steering wheel
- 2: steering shaft
- 3: steering torque sensor
- 8: steering gear
- 10: steering assist mechanism
- 13: electric motor
- 14: controller
- 15: battery
- 16: ignition switch
- 17: vehicle speed sensor
- 21: command value computing unit
- 22: command value compensating unit
- 23: motor control unit
- 31: torque system abnormality detecting unit
- 32: previous torque control unit
- 33: steering assist command value computing unit
- 34: main ECU clip (q-axis current clip)
- 35: previous torque monitoring unit
- 36: phase compensating unit
- 37: adder unit
- 38: stabilization compensating unit
- 39: responsiveness compensating unit
- 40: adder unit
- 41: angular velocity computing unit
- 42: angular acceleration computing unit
- 43: friction and inertia compensating unit
- 44: convergence compensating unit
- 45: reaction force/hysteresis compensating unit
- 46: subtractor unit
- 47: current command value computing unit
- 48: subtractor unit
- 49: current control unit
- 50: motor drive unit
- 61: previous torque monitoring and comparing unit
- 62: sub ECU interlock (q-axis current interlock)

The invention claimed is:

1. An electric power steering system comprising:
   an electric motor that applies a steering assist force for reducing a driver's steering load to a steering system;
   a torque detecting unit that detects a steering torque;
   a steering assist command value computing unit that computes a steering assist command value based upon at least the steering torque detected by the torque detecting unit;
   a clip unit that limits the steering assist command value by use of a predetermined limit value based upon the steering torque detected by the torque detecting unit does not exceed an allowable range so that the steering assist command value computed by the steering assist command value computing unit;
   a motor control unit that controls driving of the electric motor based upon the steering assist command value limited by the clip unit;
   an interlock unit that has a monitoring function of permitting or prohibiting the driving of the electric motor controlled by the motor control unit based upon the steering torque detected by the torque detecting unit;
   a torque abnormality detecting unit that detects abnormality of the steering torque detected by the torque detecting unit;
   an alternative torque value computing unit that, when the abnormality is detected by the torque abnormality detecting unit, computes an alternative steering torque value based upon the steering torque that is normal, which is detected by the torque detecting unit, when the abnormality is not detected; and
   an input switching unit that switches an input value to the clip unit and an input value to the interlock unit from the steering torque detected by the torque detecting unit to the alternative steering torque value computed by the alternative torque value computing unit, when the abnormality is detected by the torque abnormality detecting unit,
   wherein the alternative torque value computing unit computes, as the alternative steering torque value, a minimum value out of the steering torques that are normal detected by the torque detecting unit within a predetermined period of time immediately before the abnormality is detected by the torque abnormality detecting unit.

2. The electric power steering system according to claim 1, further comprising:
   a second alternative torque value computing unit that computes, when the abnormality is detected by the torque abnormality detecting unit, a second alternative steering torque value based upon the steering torque that is normal detected by the torque detecting unit when the abnormality is not detected; and
   a second input switching unit that switches an input value to the steering assist command value computing unit from the steering torque detected by the torque detecting unit to the second alternative steering torque value computed by the second alternative torque value computing unit, when the abnormality is detected by the torque abnormality detecting unit.

3. The electric power steering system according to claim 1, wherein the clip unit includes a gradual change unit that gradually changes the limit value toward zero when the abnormality is detected by the torque abnormality detecting unit.

4. The electric power steering system according to claim 1, wherein the interlock unit stops the monitoring function, when the abnormality is detected by the torque abnormality detecting unit.

5. The electric power steering system according to claim 1, further comprising an abnormality detection result determining unit that determines validity of the abnormality detection result of the torque abnormality detecting unit based upon a comparison result of the steering torque detected by the torque detecting unit with the steering torque to be input to the clip unit out of the steering torque detected by the torque detecting unit, and the alternative steering torque value computed by the alternative torque value computing unit.

6. An electric power steering system comprising:
an electric motor that applies a steering assist force for reducing a driver's steering load to a steering system;
a torque detecting unit that detects a steering torque;
a steering assist command value computing unit that computes a steering assist command value based upon at least the steering torque detected by the torque detecting unit;
a clip unit that limits the steering assist command value by use of a predetermined limit value based upon the steering torque detected by the torque detecting unit does not exceed an allowable range so that the steering assist command value computed by the steering assist command value computing unit;
a motor control unit that controls driving of the electric motor based upon the steering assist command value limited by the clip unit;
an interlock unit that has a monitoring function of permitting or prohibiting the driving of the electric motor controlled by the motor control unit based upon the steering torque detected by the torque detecting unit;
a torque abnormality detecting unit that detects abnormality of the steering torque detected by the torque detecting unit;
an alternative torque value computing unit that, when the abnormality is detected by the torque abnormality detecting unit, computes an alternative steering torque value based upon the steering torque that is normal, which is detected by the torque detecting unit, when the abnormality is not detected;
an input switching unit that switches an input value to the clip unit and an input value to the interlock unit from the steering torque detected by the torque detecting unit to the alternative steering torque value computed by the alternative torque value computing unit, when the abnormality is detected by the torque abnormality detecting unit,
a second alternative torque value computing unit that computes, when the abnormality is detected by the torque abnormality detecting unit, a second alternative steering torque value based upon the steering torque that is normal detected by the torque detecting unit when the abnormality is not detected; and
a second input switching unit that switches an input value to the steering assist command value computing unit from the steering torque detected by the torque detecting unit to the second alternative steering torque value computed by the second alternative torque value computing unit, when the abnormality is detected by the torque abnormality detecting unit.

7. The electric power steering system according to claim 6, wherein the clip unit includes a gradual change unit that gradually changes the limit value toward zero when the abnormality is detected by the torque abnormality detecting unit.

8. The electric power steering system according to claim 6, wherein the interlock unit stops the monitoring function, when the abnormality is detected by the torque abnormality detecting unit.

9. The electric power steering system according to claim 6, further comprising an abnormality detection result determining unit that determines validity of the abnormality detection result of the torque abnormality detecting unit based upon a comparison result of the steering torque detected by the torque detecting unit with the steering torque to be input to the clip unit out of the steering torque detected by the torque detecting unit, and the alternative steering torque value computed by the alternative torque value computing unit.

10. An electric power steering system comprising:
an electric motor that applies a steering assist force for reducing a driver's steering load to a steering system;
a torque detecting unit that detects a steering torque;
a steering assist command value computing unit that computes a steering assist command value based upon at least the steering torque detected by the torque detecting unit;
a clip unit that limits the steering assist command value by use of a predetermined limit value based upon the steering torque detected by the torque detecting unit does not exceed an allowable range so that the steering assist command value computed by the steering assist command value computing unit;
a motor control unit that controls driving of the electric motor based upon the steering assist command value limited by the clip unit;
an interlock unit that has a monitoring function of permitting or prohibiting the driving of the electric motor controlled by the motor control unit based upon the steering torque detected by the torque detecting unit;
a torque abnormality detecting unit that detects abnormality of the steering torque detected by the torque detecting unit;
an alternative torque value computing unit that, when the abnormality is detected by the torque abnormality detecting unit, computes an alternative steering torque value based upon the steering torque that is normal, which is detected by the torque detecting unit, when the abnormality is not detected; and
an input switching unit that switches an input value to the clip unit and an input value to the interlock unit from the steering torque detected by the torque detecting unit to the alternative steering torque value computed by the alternative torque value computing unit, when the abnormality is detected by the torque abnormality detecting unit,
wherein the clip unit includes a gradual change unit that gradually changes the limit value toward zero when the abnormality is detected by the torque abnormality detecting unit.

11. The electric power steering system according to claim 10, wherein the interlock unit stops the monitoring function, when the abnormality is detected by the torque abnormality detecting unit.

12. The electric power steering system according to claim 10, further comprising an abnormality detection result determining unit that determines validity of the abnormality detection result of the torque abnormality detecting unit based upon a comparison result of the steering torque detected by the torque detecting unit with the steering torque to be input to the clip unit out of the steering torque detected by the torque detecting unit, and the alternative steering torque value computed by the alternative torque value computing unit.

13. An electric power steering system comprising:
an electric motor that applies a steering assist force for reducing a driver's steering load to a steering system;
a torque detecting unit that detects a steering torque;
a steering assist command value computing unit that computes a steering assist command value based upon at least the steering torque detected by the torque detecting unit;
a clip unit that limits the steering assist command value by use of a predetermined limit value based upon the steering torque detected by the torque detecting unit does not exceed an allowable range so that the steering assist command value computed by the steering assist command value computing unit;
a motor control unit that controls driving of the electric motor based upon the steering assist command value limited by the clip unit;
an interlock unit that has a monitoring function of permitting or prohibiting the driving of the electric motor controlled by the motor control unit based upon the steering torque detected by the torque detecting unit;
a torque abnormality detecting unit that detects abnormality of the steering torque detected by the torque detecting unit;
an alternative torque value computing unit that, when the abnormality is detected by the torque abnormality detecting unit, computes an alternative steering torque value based upon the steering torque that is normal, which is detected by the torque detecting unit, when the abnormality is not detected; and
an input switching unit that switches an input value to the clip unit and an input value to the interlock unit from the steering torque detected by the torque detecting unit to the alternative steering torque value computed by the alternative torque value computing unit, when the abnormality is detected by the torque abnormality detecting unit,
wherein the interlock unit stops the monitoring function, when the abnormality is detected by the torque abnormality detecting unit.

14. The electric power steering system according to claim 13, further comprising an abnormality detection result determining unit that determines validity of the abnormality detection result of the torque abnormality detecting unit based upon a comparison result of the steering torque detected by the torque detecting unit with the steering torque to be input to the clip unit out of the steering torque detected by the torque detecting unit, and the alternative steering torque value computed by the alternative torque value computing unit.

15. An electric power steering system comprising:
an electric motor that applies a steering assist force for reducing a driver's steering load to a steering system;
a torque detecting unit that detects a steering torque;
a steering assist command value computing unit that computes a steering assist command value based upon at least the steering torque detected by the torque detecting unit;
a clip unit that limits the steering assist command value by use of a predetermined limit value based upon the steering torque detected by the torque detecting unit does not exceed an allowable range so that the steering assist command value computed by the steering assist command value computing unit;
a motor control unit that controls driving of the electric motor based upon the steering assist command value limited by the clip unit;
an interlock unit that has a monitoring function of permitting or prohibiting the driving of the electric motor controlled by the motor control unit based upon the steering torque detected by the torque detecting unit;
a torque abnormality detecting unit that detects abnormality of the steering torque detected by the torque detecting unit;
an alternative torque value computing unit that, when the abnormality is detected by the torque abnormality detecting unit, computes an alternative steering torque value based upon the steering torque that is normal, which is detected by the torque detecting unit, when the abnormality is not detected;
an input switching unit that switches an input value to the clip unit and an input value to the interlock unit from the steering torque detected by the torque detecting unit to the alternative steering torque value computed by the alternative torque value computing unit, when the abnormality is detected by the torque abnormality detecting unit, and
an abnormality detection result determining unit that determines validity of the abnormality detection result of the torque abnormality detecting unit based upon a comparison result of the steering torque detected by the torque detecting unit with the steering torque to be input to the clip unit out of the steering torque detected by the torque detecting unit, and the alternative steering torque value computed by the alternative torque value computing unit.

* * * * *